UNITED STATES PATENT OFFICE.

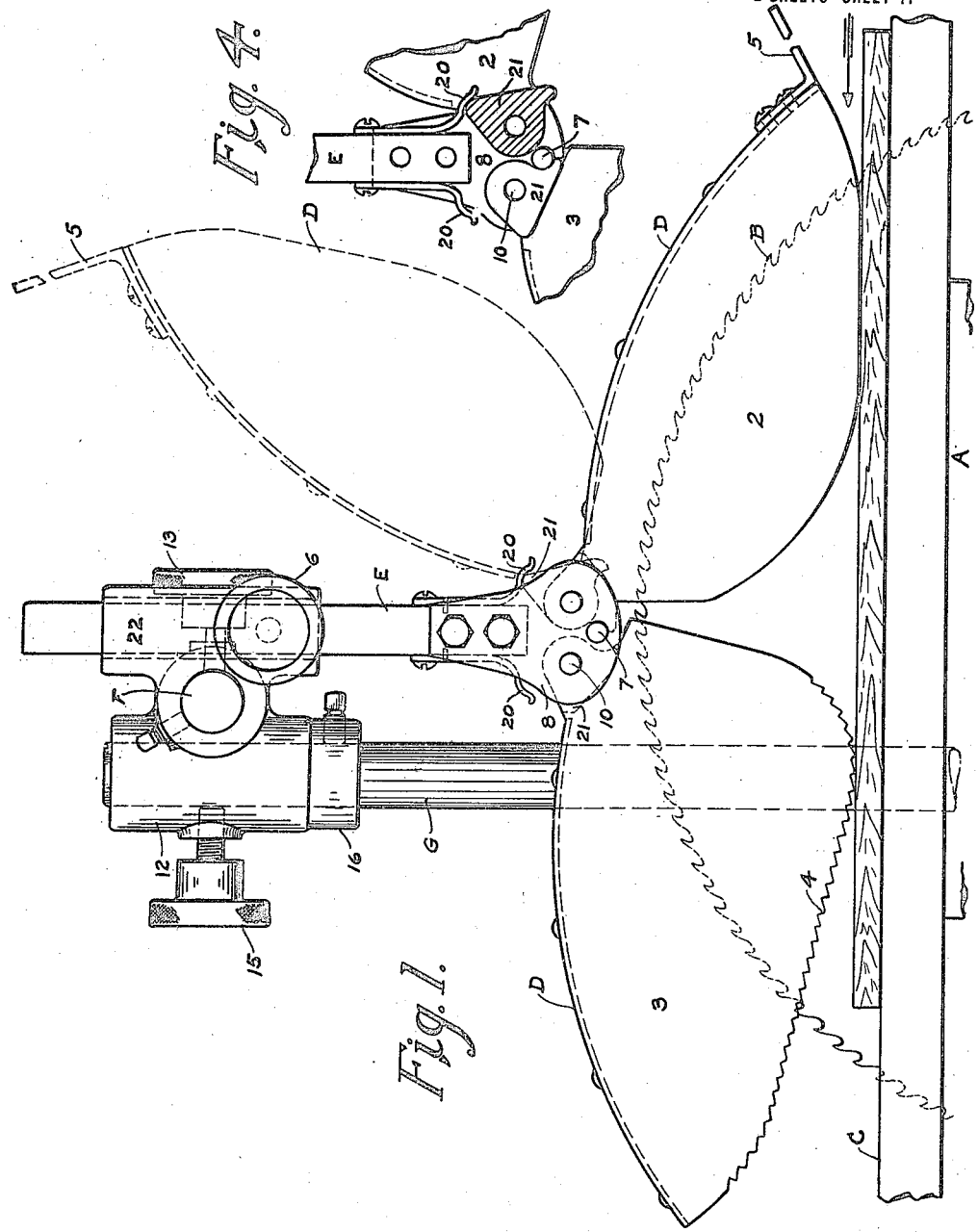

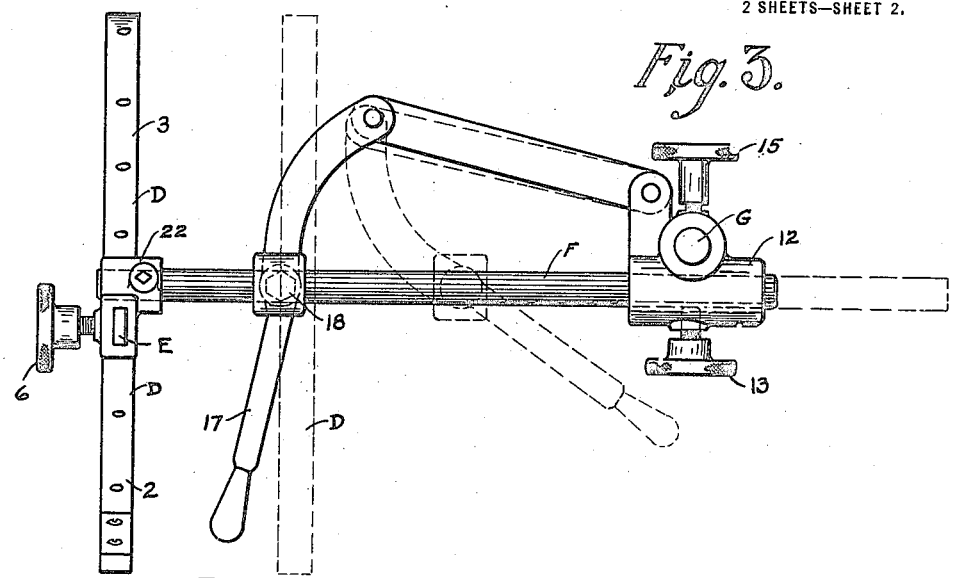
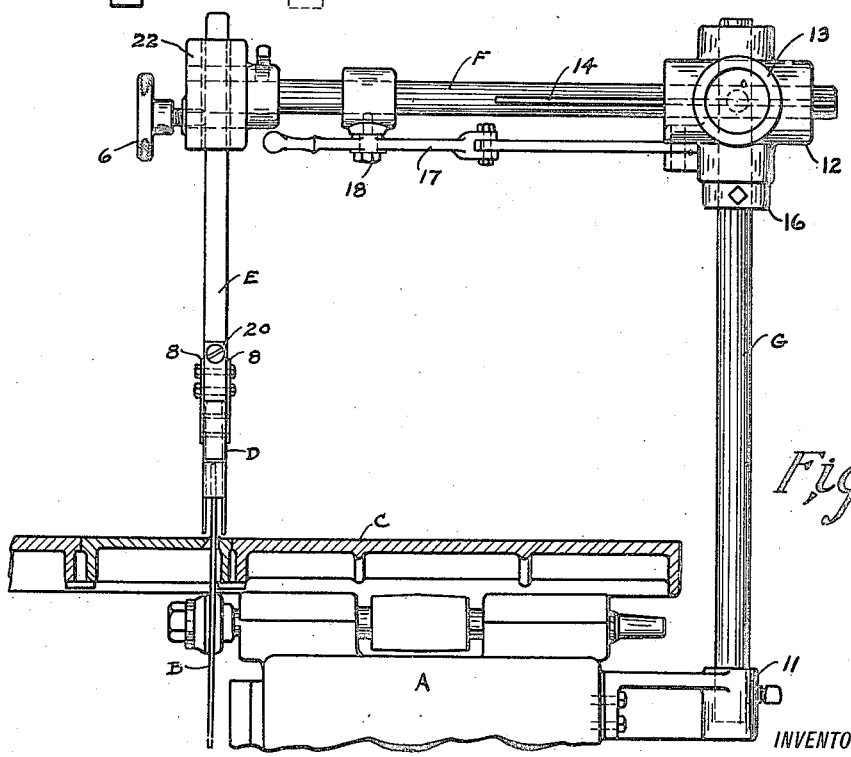

JAMES D. McMICHAEL, OF ROCHESTER, NEW YORK.

SAW GUARD.

1,427,005.

Specification of Letters Patent.  Patented Aug. 22, 1922.

Application filed December 26, 1919. Serial No. 347,547.

*To all whom it may concern:*

Be it known that I, JAMES D. McMICHAEL, a citizen of the United States, residing at #28 Post Ave., city of Rochester, State of New York, have invented a new and Improved Saw Guard, of which the following is a specification.

In the accompanying drawings, Fig. 1 is a side elevation of my invention in working position on a circular saw table: Fig. 2 is an end or front elevation of the same, showing one method of its attachment to a saw bench frame: Figure 3 is a plan view. Fig. 4 is a sectional elevation of the supporting and locking features of my invention.

The object of my invention is to provide a guard for circular saws which shall occupy little room around the saw, is flexible vertically to accommodate stock of varying thickness, is safe for the operator and simple in construction and effective in operation; and it consists mainly in covering the saw with a guard made in two contiguous longitudinal sections hinged to swing independently and automatically, and in devices used in connection therewith for carrying out my invention.

A, Figs. 1 and 2. is one form of saw bench frame to which my invention may be attached. B is the saw and C is the table supporting the work. D represents my improved guard made in two longitudinal sections 2 and 3, the inner ends of which are closely contiguous when resting on the work on table C as in Fig. 1. These sections are supported upon a vertical bar E which in turn is supported over the saw table by socket 22 and a horizontal arm F, Figs. 2 and 3. The sections 2 and 3 of the guard are pivoted to the bar E or to ears 8, secured thereto, so that either section can rise or fall automatically as the stock to be cut passes under them.

On account of the peculiar outline of the lower edges of the sections 2 and 3, it will be seen that as the sections swing upward either their straight lower edges or the curved inner edges are always in contact with the material being sawed and therefore always safely cover the teeth of the saw. Section 3 of the guard is provided with sharp teeth or spurs 4 on its lower edges, which act to prevent the stock from flying back in case it is caught by the saw. I prefer to make the sections 2 and 3 of sheet steel which can be bent into box form so as to enclose the saw and leave ample clearance for the same, and in this case the teeth 4 may be cut into the working edges as indicated in Fig. 1, and in case the teeth need sharpening after use, it can be done with a file. If, however, the sections are made of heavier material, sharp pointed pins may be inserted in the edges and bent slightly forward so as to catch into the surface of the work.

In order to make section 3 more effective in preventing "fly-backs" I provide a stop 7 on the bar E or the ears 8, which by coming into contact with the blocks 21, Fig. 4 of the sections prevents them from swinging too far and at the same time the teeth 4 are crowded into the material on account of the pivot 10 being considerably above the line of contact of the teeth.

An entrance lip or incline 5 is provided on the feeding in section in advance of the saw as is usual in this class of attachments, and thus as the lumber is fed in under the guard each section is free to swing up on its pivot to a considerable height without the necessity of lifting the support E. When, however, very thick material is fed in, the bar E can be raised by slacking the finger wheel 6 in socket 22 and setting the bar and guard at any desired height within the capacity of the saw. The sections as ordinarily adjusted will lift several inches.

For the purpose of giving access to the saw and displacing the guard when not wanted, I provide a vertical bar G secured to the saw frame A by a bracket 11 to which the bar G is rigidly attached. A socket 12 is fitted to this bar and through a horizontal opening in it the arm F slides and is clamped by a set screw 13, Figs. 2 and 3, which operates to clamp a key or spline fitted to the slot 14 in arm F. Obviously bar F may be rectangular in cross section, thus dispensing with the key and slot 14. The socket 12 may be clamped to the vertical bar G by a set screw 15, and a collar 16 is clamped on bar G to support the socket 12 and its attached parts.

A hand lever 17 is pivoted to the arm F at 18 and the opposite end of said lever is linked to an ear on the socket 12. Thus when the set screw 13 is slacked off and the guard D is lifted above the saw, the lever 17 which is near the operator is used to push the guard over to a point corresponding to the dotted lines in Fig. 3, or further if required, without the operator changing his position. In this connection it will be observed that it is also possible by means of collar 16 to swing the arm F around the vertical bar G when screw 15 is slacked off, whereby the entire saw table can be left clear for any purpose.

In addition to the above adjustments, each section 2 and 3 can be lifted on its pivot to a position shown by dotted lines in Fig. 1 and locked by spring hooks 20 which catch and hold blocks 21 which fill the space between the side plates of the guard, and by this means access may be had to the saw readily without shifting the entire guard. It will be seen from the several adjustments of my improved guard described and shown, that the objections usually made to such guards, that they are in the way and inconvenient to handle and adjust, are practically removed and that there can be no excuse for the operator to lay it aside instead of using it in obedience to safety laws.

What I claim as my invention and desire to secure by Letters Patent is:

1. A saw guard formed to substantially cover the saw in its working position and attached to a vertically adjusted support, said support being secured to a horizontal sliding bar and means convenient for sliding the horizontal bar and the saw guard out of the range of the saw when required.

2. A saw guard formed to substantially cover the saw in its working position and attached to a vertically adjustable support, said support being secured to a horizontal sliding bar, a hand lever pivoted to the horizontal bar and linked to a stationary element in the guard supporting mechanism, whereby the guard may be lifted clear of the saw and shifted transversely out of the range of the saw.

3. A saw guard made in two longitudinal sections formed to substantially cover the saw when in working position, the sections being hinged at or near their contiguous inner ends to a common support, said support having a vertical adjustment, a transverse adjustment by a convenient hand lever and a swinging adjustment on a vertical bar for partially or wholly clearing the table when required.

JAMES D. McMICHAEL.

Witnesses:
F. H. CLEMENT,
C. S. RICHMAN.